UNITED STATES PATENT OFFICE.

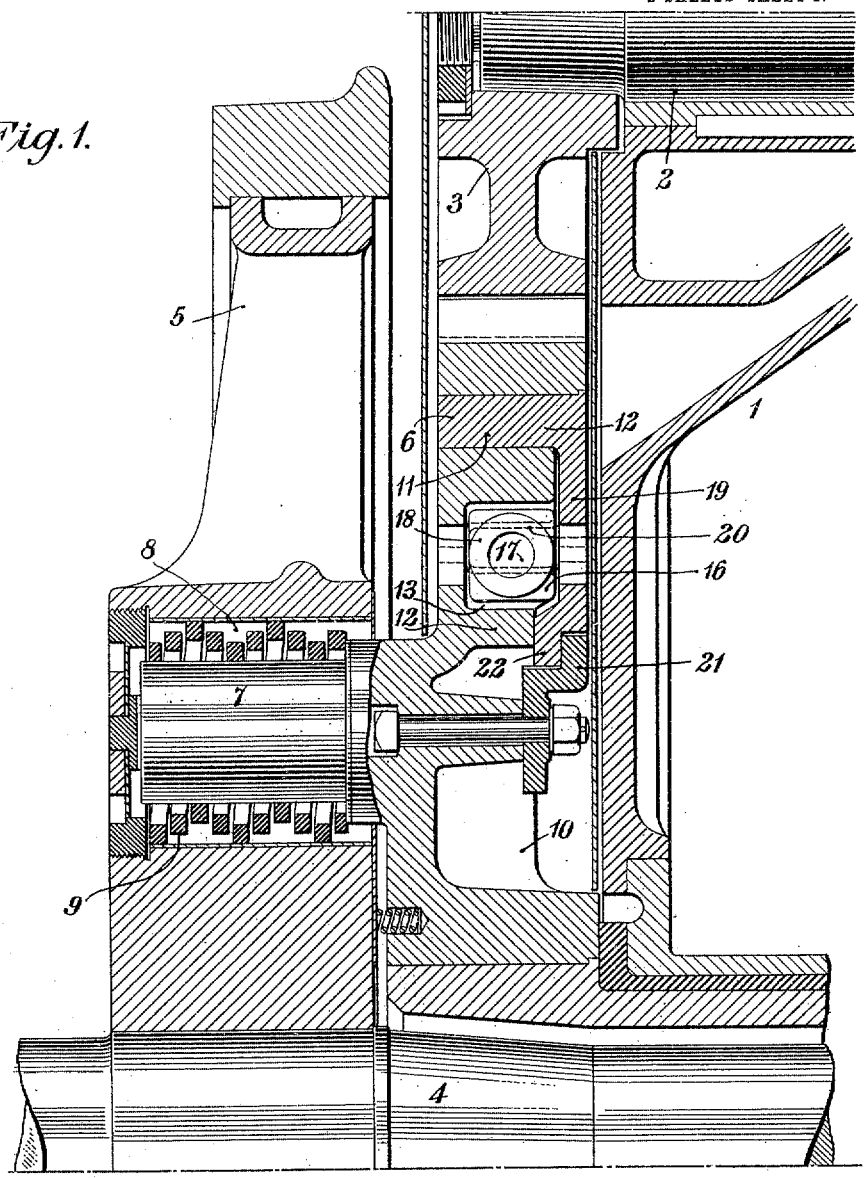

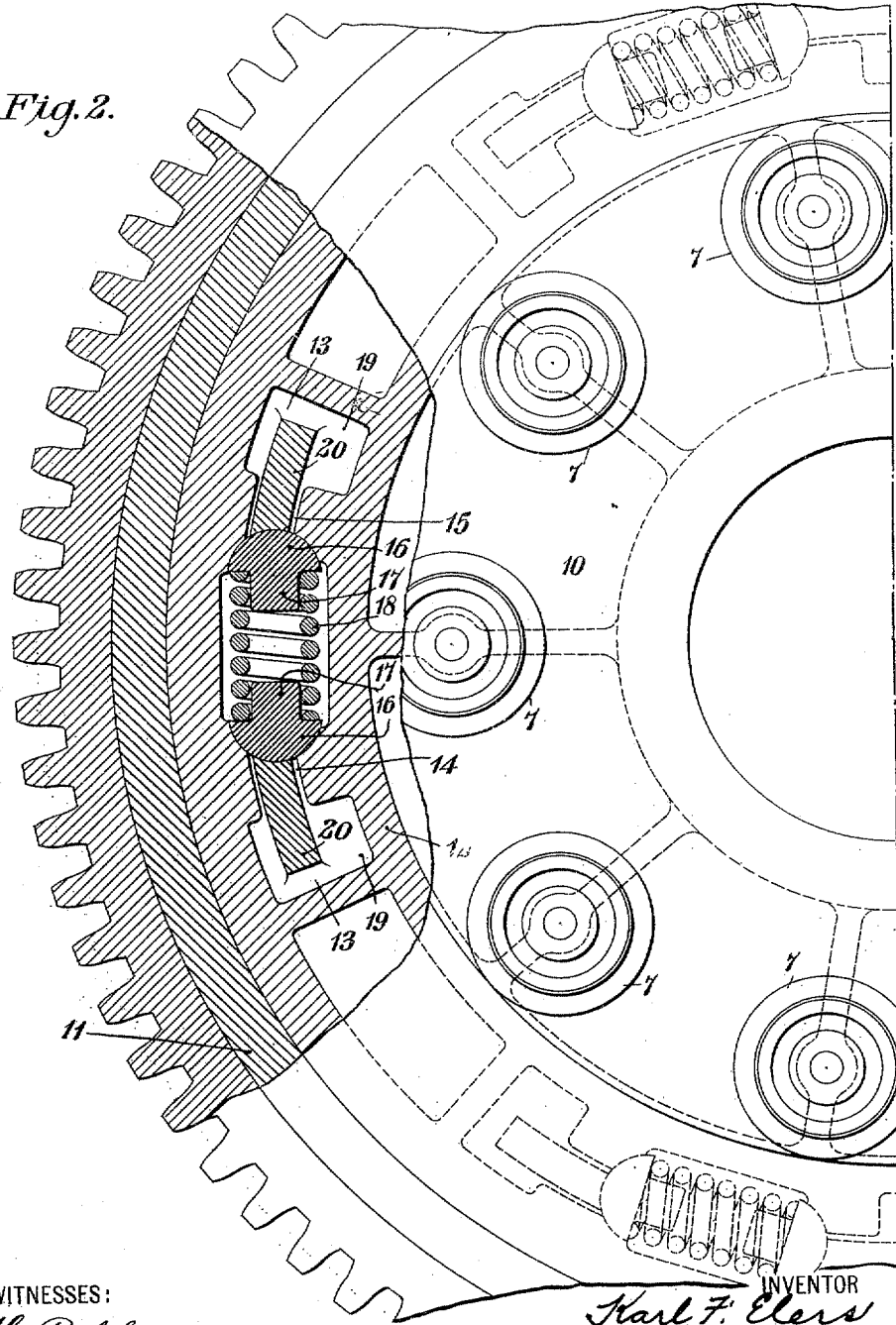

KARL F. ELERS, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

GEAR-WHEEL.

985,518.  Specification of Letters Patent.  Patented Feb. 28, 1911.

Application filed October 7, 1908. Serial No. 456,669.

*To all whom it may concern:*

Be it known that I, KARL F. ELERS, a citizen of the United States, and a resident of Pittsburg, in the county of Allegheny and State of Pennsylvania, have invented a new and useful Improvement in Gear-Wheels, of which the following is a specification.

My invention relates to gear wheels and similar devices by which the transmission of mechanical power is effected, and it has for its object to provide an improved device of this character, that shall be so constituted structurally as to include cushioning devices for the purpose of absorbing the preliminary shock exerted upon its rigid hub or rim members when it is operated as a driving pinion or as a driven gear wheel.

It is specially desirable to utilize a resilient connection between the shaft of a railway motor and the truck axle which is driven therefrom in order to avoid the usual shock which the gearing receives when the electric current is first applied to the motor. When motors of this class are supplied with single phase alternating current energy of low frequency, undesirable variations in torque may continually be observed and by utilizing my resilient transmission gear these variations are absorbed.

I have provided, according to my present invention, an improved resilient gear structure which is simple and durable in construction and has numerous other advantages by reason of its symmetry and flexibility.

Figure 1 of the accompanying drawing is a sectional plan view of a portion of a railway motor operatively connected to a truck wheel of an electric vehicle by means of a resilient gear wheel constructed in accordance with my invention. Fig. 2 is an end elevation of the gear wheel shown in Fig. 1, certain of the parts being broken away to disclose the resilient structure in detail.

Referring to the drawings, the matter illustrated comprises an electric motor 1, having a shaft 2 and a driving pinion 3, a truck axle 4, to which wheels 5 are secured, and a driving gear wheel 6, which is interposed between the wheels 5 and the pinion 3. As illustrated in the drawings, the gear wheel 6 is provided with a plurality of cylindrical projections 7 that extend outwardly in an axial direction into a plurality of pockets 8, with which the wheels 5 are provided, and from the walls of which they are separated by specially constructed helical springs 9. I deem it unnecessary to describe in detail the connection between the gear wheel 6 and the truck wheels 5, since the former may be operatively connected to the latter by any suitable means and since the structure illustrated is fully described in Patent No. 894,915, granted August 4th, 1908, to the Westinghouse Electric & Manufacturing Company, assignee of Norman W. Storer.

The gear wheel itself, which embodies my present invention, comprises a body portion 10, and a rim member 11. The body portion is provided with an annular flange 12 having pockets 13. Each of the pockets 13 is open at one side and is constricted at two points 14 and 15 near its ends, the adjacent surfaces of the constricted portions being finished to produce sockets for the reception of semi-cylindrical blocks 16 having tangential projections 17 which extend toward each other and into the opposite ends of a helical spring 18 the axis of which is also tangential.

The rim member 11 of the gear wheel is provided with a flange 19 which substantially covers the openings in the pockets 13 and is provided with projections 20 which extend laterally into the pockets 13 between their end walls and the semi-cylindrical surfaces of the blocks 16. The adjacent edges of the projections 20 are finished to fit the semi-cylindrical surfaces of the blocks 16 with which they are adapted to engage. The arrangement of parts is such that there is only a relatively short distance between the outer ends of the projections 20 and the outer walls of the pockets 13, so that relative rotation between the body member and the rim of the gear wheel is restricted to a small angle. On the other hand, the inner ends of the projections 20 are in close engagement with the blocks 16 so that the relative rotation referred to is opposed in both directions by the helical springs.

The rim member 11 of the gear wheel is fitted directly upon the outer cylindrical surface of the flange 12 and is held in position by means of the flange 19 and also by means of an annular clamping ring 21 which is bolted to the body of the wheel and overlaps an inwardly extending annular projection 22 with which the flange 19 is provided. The springs 18 are preferably located at equal intervals about the circumference of the annular projection and their number and strength may be varied to suit the conditions of service for which the driving connection is intended.

The semi-cylindrical form of the blocks 16 enables the springs to seat themselves, when compressed, so that their center lines may remain straight and tangential when the gear is operating.

It is conceivable that variations in size and arrangement of details may be effected within the spirit and scope of my invention.

I claim as my invention:

1. In a resilient gear wheel or pinion, the combination with a hub or body member having concentric ring projections joined by radial ribs to provide pockets, and a rim member rotatably movable on the hub member and having ring segment projections that extend into said pockets, of a plurality of tangentially disposed helical springs and semi-cylindrical blocks having shanks that project into the springs, said springs and blocks being interposed between the ring segment projections and the pocket walls for opposing relative rotation between the hub member and the rim member.

2. In a resilient gear wheel or pinion, the combination with a hub or body member having concentric ring projections joined by radial ribs to provide pockets and a rim member having ring segment projections that extend into the pockets, and are provided with concave faces of a plurality of tangentially disposed helical springs and semi-cylindrical blocks to engage the concave faces of said ring segment projections and having shanks that project into the springs, said springs and blocks being interposed between the ring segment projections and the pocket walls for opposing relative rotation between the hub member and the rim member.

3. A resilient gear wheel or pinion comprising a hub or body member having ring segment recesses near its periphery provided with constricted portions, a rim member having an annular projection that covers the openings in the recesses in the body member and ring segment projections that extend laterally into the recesses, and tangential springs interposed between the constricted portions of the recesses, said ring segment projections being adapted to compress the springs from one end or the other according to the direction of relative rotation between the rim member and the body member of the gear wheel.

4. A resilient gear wheel or pinion comprising a hub or body member having ring segment recesses near its periphery provided with constricted portions, a rim member having an annular projection that covers the openings in said recesses and ring segment projections that extend laterally into the recesses, tangential springs interposed between the constricted portions of the recesses, and semi-cylindrical blocks seated in the walls of the constricted portions and having shanks that extend into the ends of the springs, said segment ring projections being adapted to engage the blocks and compress the springs from one end or the other according to the direction of relative rotation between the rim member and the body member of the gear wheel.

In testimony whereof, I have hereunto subscribed my name this 30th day of Sept., 1908.

KARL F. ELERS.

Witnesses:
EDVIN TIDLUND,
BIRNEY HINES.